(12) United States Patent
Teraguchi et al.

(10) Patent No.: US 8,127,878 B2
(45) Date of Patent: Mar. 6, 2012

(54) INTAKE AIR INTRODUCING STRUCTURE FOR AUTOMOBILE

(75) Inventors: Sunao Teraguchi, Wako (JP); Yohei Okagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 133 days.

(21) Appl. No.: 12/649,061

(22) Filed: Dec. 29, 2009

(65) Prior Publication Data

US 2010/0170734 A1 Jul. 8, 2010

(30) Foreign Application Priority Data

Jan. 7, 2009 (JP) ................................. 2009-001809

(51) Int. Cl.
*B60K 13/02* (2006.01)
*B60K 11/08* (2006.01)

(52) U.S. Cl. ...................................... 180/68.3; 180/68.1

(58) Field of Classification Search ................. 180/68.1, 180/68.2, 68.3; 296/193.1
See application file for complete search history.

(56) References Cited

U.S. PATENT DOCUMENTS

| | | | |
|---|---|---|---|
| 5,660,243 A * | 8/1997 | Anzalone et al. ............ | 180/68.1 |
| 5,794,733 A | 8/1998 | Stosel et al. | |
| 5,860,685 A * | 1/1999 | Horney et al. ................ | 293/113 |
| 6,698,539 B2 * | 3/2004 | Decuir ........................ | 180/68.3 |
| 7,069,893 B2 | 7/2006 | Cusumano et al. | |
| 7,237,635 B2 | 7/2007 | Khouw et al. | |
| 7,469,762 B2 * | 12/2008 | Kim ............................. | 180/68.1 |
| 7,717,204 B2 * | 5/2010 | Kondou et al. .............. | 180/68.1 |
| 2003/0042055 A1 * | 3/2003 | Suwa et al. .................. | 180/68.3 |
| 2003/0188902 A1 * | 10/2003 | Decuir ........................ | 180/68.3 |
| 2005/0230162 A1 | 10/2005 | Murayama et al. | |
| 2005/0279547 A1 | 12/2005 | Udo et al. | |
| 2006/0006012 A1 * | 1/2006 | Khouw et al. ............... | 180/68.3 |
| 2009/0242296 A1 * | 10/2009 | Goldsberry .................. | 180/68.3 |

FOREIGN PATENT DOCUMENTS

| | | |
|---|---|---|
| DE | 9202785 U1 | 4/1992 |
| EP | 1637726 A1 | 3/2006 |
| EP | 1955903 A2 | 8/2008 |
| JP | 64-18918 U | 1/1989 |
| JP | 4-104153 U | 9/1992 |
| JP | 7-4133 U | 1/1995 |
| JP | 9-189273 A | 7/1997 |
| JP | 2002-211252 A | 7/2002 |
| JP | 2006-1540 A | 1/2006 |
| JP | 2006-27596 A | 2/2006 |
| JP | 2006-193122 A | 7/2006 |
| JP | 2008-189280 A | 8/2008 |
| JP | 2008-201324 A | 9/2008 |
| JP | 2008-247122 A | 10/2008 |

* cited by examiner

*Primary Examiner* — John R Olszewski
(74) *Attorney, Agent, or Firm* — Arent Fox LLP

(57) ABSTRACT

An intake air introducing structure for an automobile includes an intake air guide member provided between a front grill and a radiator. The intake air guide member is open at front and upper sides, and has a curved guide surface that inclines upward from a bottom side toward a rear side and has a curved shape that protrudes downward. A block wall protrudes toward a side of the curved guide surface and is provided in an upper portion of the curved guide surface.

9 Claims, 6 Drawing Sheets

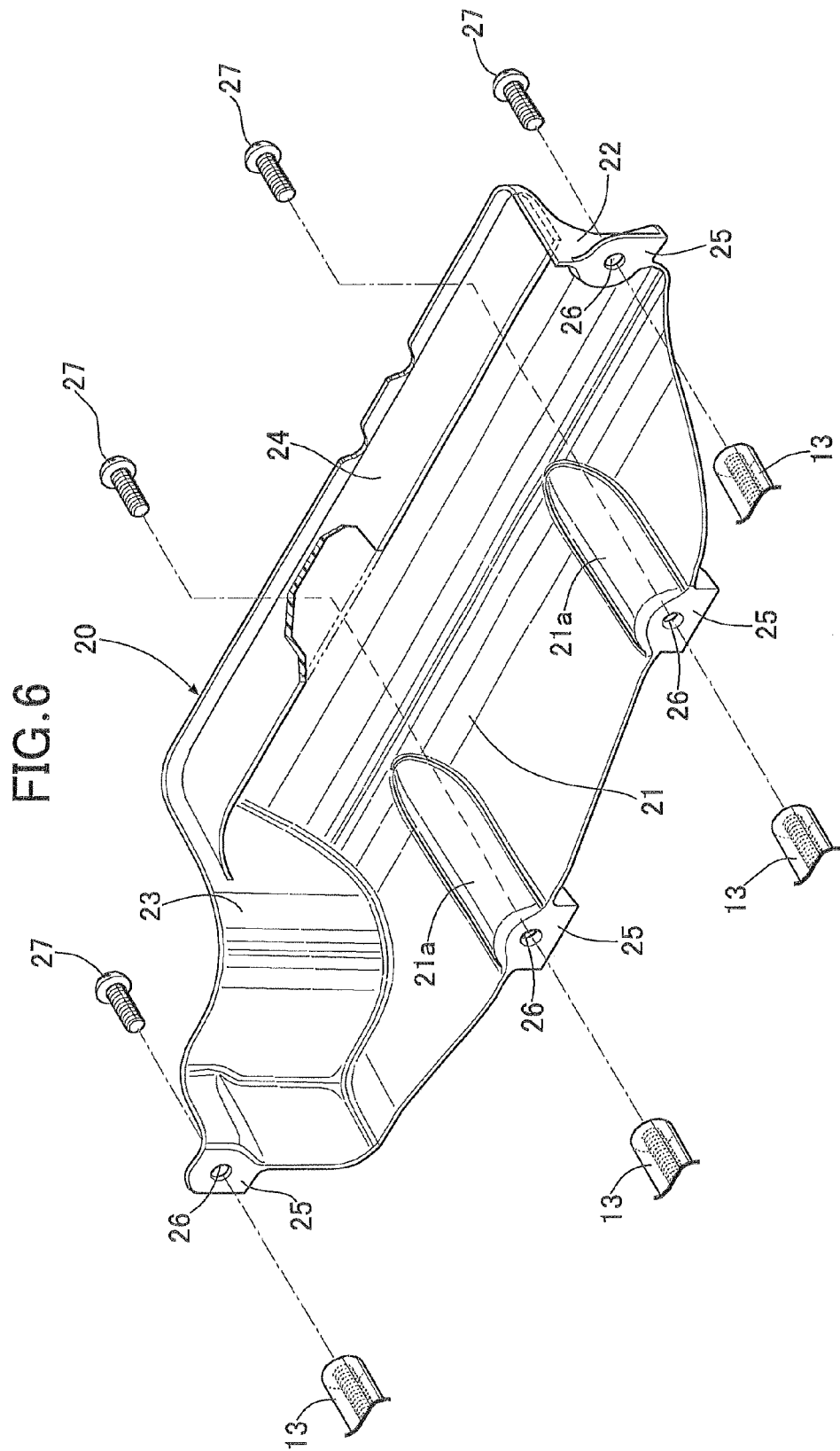

INTAKE AIR INTRODUCING STRUCTURE FOR AUTOMOBILE

CROSS-REFERENCE TO RELATED APPLICATION

This application claims the priority of Japanese Application No. 2009-1809, filed Jan. 7, 2009, the entire specification, claims and drawings of which are incorporated herewith by reference.

BACKGROUND OF THE INVENTION

1. Field of the Invention

The present invention relates to an intake air introducing structure which introduces outside air from a front grill located at a front portion of an automobile body into an intake system of an engine in an automobile.

2. Description of the Related Art

A conventional intake air introducing structure for an automobile is disclosed in Japanese Patent Application Laid-Open No. 2002-211252 (JP '252) wherein outside air introduced through a front grill into an automobile body is guided through a radiator core support outer panel provided in a gap between a hood panel and a radiator to a nozzle introduction port of an intake duct provided in a rear upper position of the radiator.

Incidentally, when the outside air is guided to an intake system of an engine disposed on a rear portion of the radiator, the outside air is guided through an introduction passage formed between a lower surface of a front panel and an upper surface of the radiator to an intake air introducing port of the engine as disclosed in JP '252. In this case, it is a criteria that a necessary and sufficient amount of outside air is able to flow through the introduction passage while foreign matter, such as moisture or dust, included in the outside air is effectively removed from the outside air. However, the structure disclosed in JP '252 is not configured to satisfy such a criteria.

SUMMARY OF THE INVENTION

The present invention was attained in view of the above-discussed points, wherein an aspect of the invention ensures a sufficient amount of outside air flowing from a front grill to an intake air introduction port, while ensuring that foreign matter, such as moisture or dust, is effectively removed from the outside air.

In order to achieve such an aspect, according to a first feature of the present invention, an intake air introducing structure for an automobile is provided in which outside air introduced from a front grill is guided to an intake air introduction port of an automobile body disposed above a radiator, wherein an intake air guide member is provided between the front grill and the radiator, and is mounted to the front grill; the intake air guide member is open at a front side and an upper side so as to receive the outside air from the front grill, and has a curved guide surface that is inclined upward from a bottom side toward a rear side and has a curved shape which protrudes downward; and a block wall is provided on an upper portion of the curved guide surface and protrudes toward the front side from the curved guide surface.

According to a second feature of the present invention, a gap is formed between a front end edge on a side of the front grill of the intake air guide member and the front grill. The front end edge of the intake air guide member is located in a position lower than a vent in the front grill. As such, the foreign matter separated and removed from the outside air by the block wall of the intake air guide member is discharged through the gap to the outside without being influenced by running air.

According to a third feature of the present invention, a bulkhead is provided between the front grill and the radiator, the intake air guide member is provided between the front grill and the bulkhead, a rear portion of the curved guide surface extends above the bulkhead, and the outside air guided by the intake air guide member passes above the bulkhead and is guided to the intake air introduction port. Because the curved guide surface of the intake air guide member extends above the bulkhead, the outside air is guided to the intake air introduction port without being interrupted by the bulkhead.

According to a fourth feature of the present invention, a grill cover spans the front grill and the bulkhead above the intake air guide member, a vent window is opened in a portion of the grill cover corresponding to the intake air guide member, and the outside air guided by the curved guide surface passes through the vent window and is guided to the intake air introduction port.

Accordingly, introduction of the outside air into the intake air introduction port is not prevented even if the grill cover is provided and blocks the front grill and the bulkhead. Also, the grill cover covers a space between the front grill and the bulkhead so that the front grill and the bulkhead are not exposed to the outside, therefore, the grill cover provides a good appearance, and can further prevent tools, such as for maintenance of devices around the engine, from falling into the intake air guide member.

According to a fifth feature of the present invention, the intake air introduction port is disposed in a position that is higher than the bulkhead and is secured to a stay mounted to the bulkhead. As such, the outside air is easily guided to the intake air introduction port without being interrupted by the bulkhead, and the support strength of the intake air introduction port is increased.

According to a sixth feature of the present invention, a discharge port is formed in the stay. Thus, the foreign matter, such as moisture or dust, remaining in the outside air guided to the intake air introduction port is separated and removed through the discharge port to the outside.

With the above-discussed features of the present invention, the intake air guide member disposed between the front grill and the radiator can ensure a sufficient amount of outside air, from which foreign matter has been removed and which is guided to an intake port of the intake duct.

In the configuration of the present invention discussed herein, the terms "front, rear", "left, right" and "upper, lower" are used with reference to a front side in an advancing direction of the automobile. Thus, the "front side" refers to the side of the front grill, the "upper side" refers to a side of a hood panel of the intake air guide member, the "bottom side" refers to the side opposite from the hood panel, and the "rear side" refers to a side of a driver seat of the intake air guide member.

The above and other aspects, characteristics and advantages of the present invention will be clear from detailed descriptions which will be provided below for the preferred embodiment while referring to the attached drawings.

BRIEF DESCRIPTION OF THE DRAWINGS

FIG. 6 is a perspective view of an intake air guide member.

DESCRIPTION OF THE PREFERRED EMBODIMENT

An embodiment of the present invention will be described below with reference to the attached drawings.

In the following description, the terms "front, rear", "left, right" and "upper, lower" are used with reference to a front side in an advancing direction of an automobile.

Figure 1:
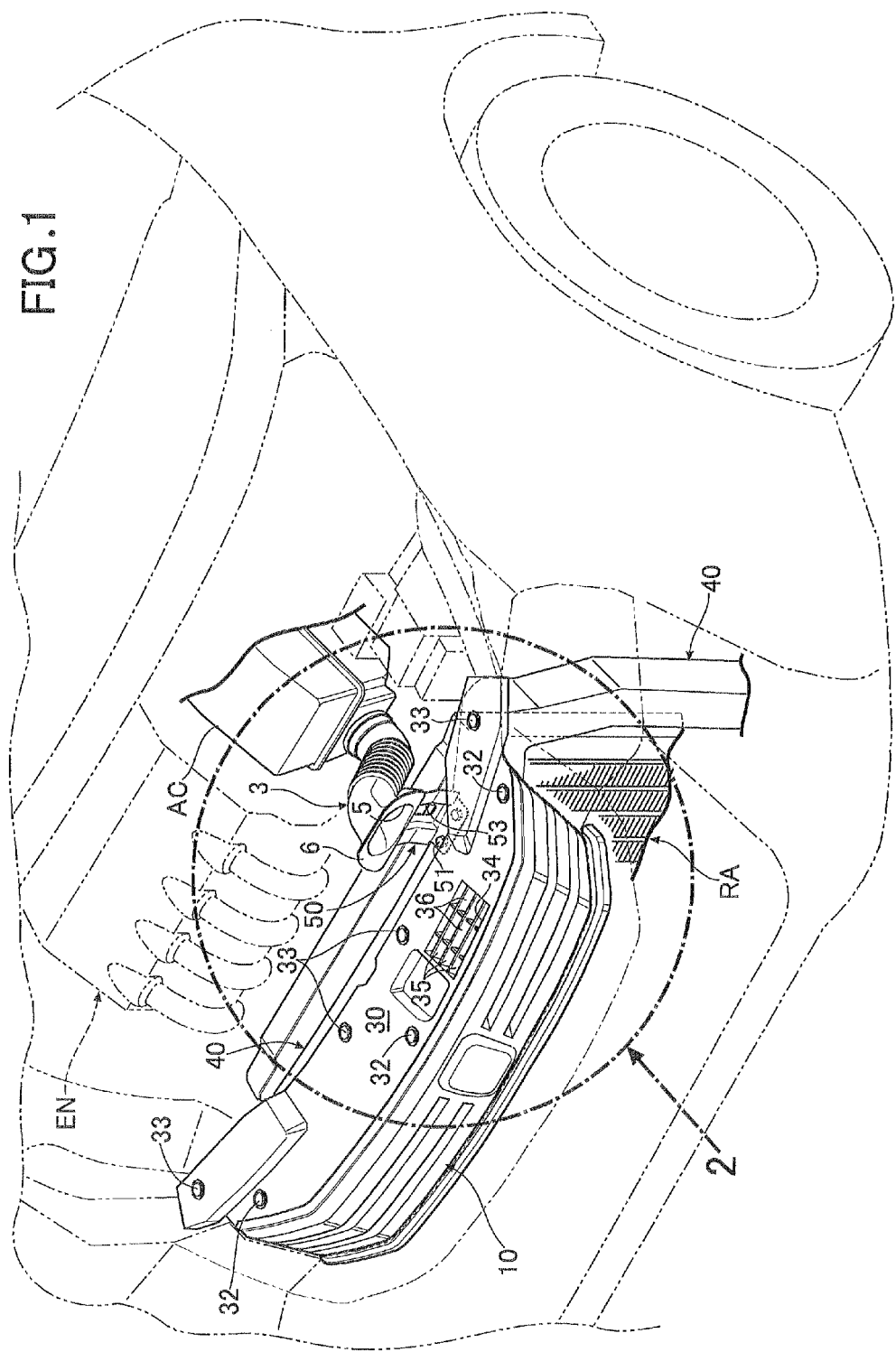
FIG. 1 is a perspective view of a front part of an automobile including an intake air introducing structure for an automobile according to a preferred embodiment of the present invention.
Figure 2:
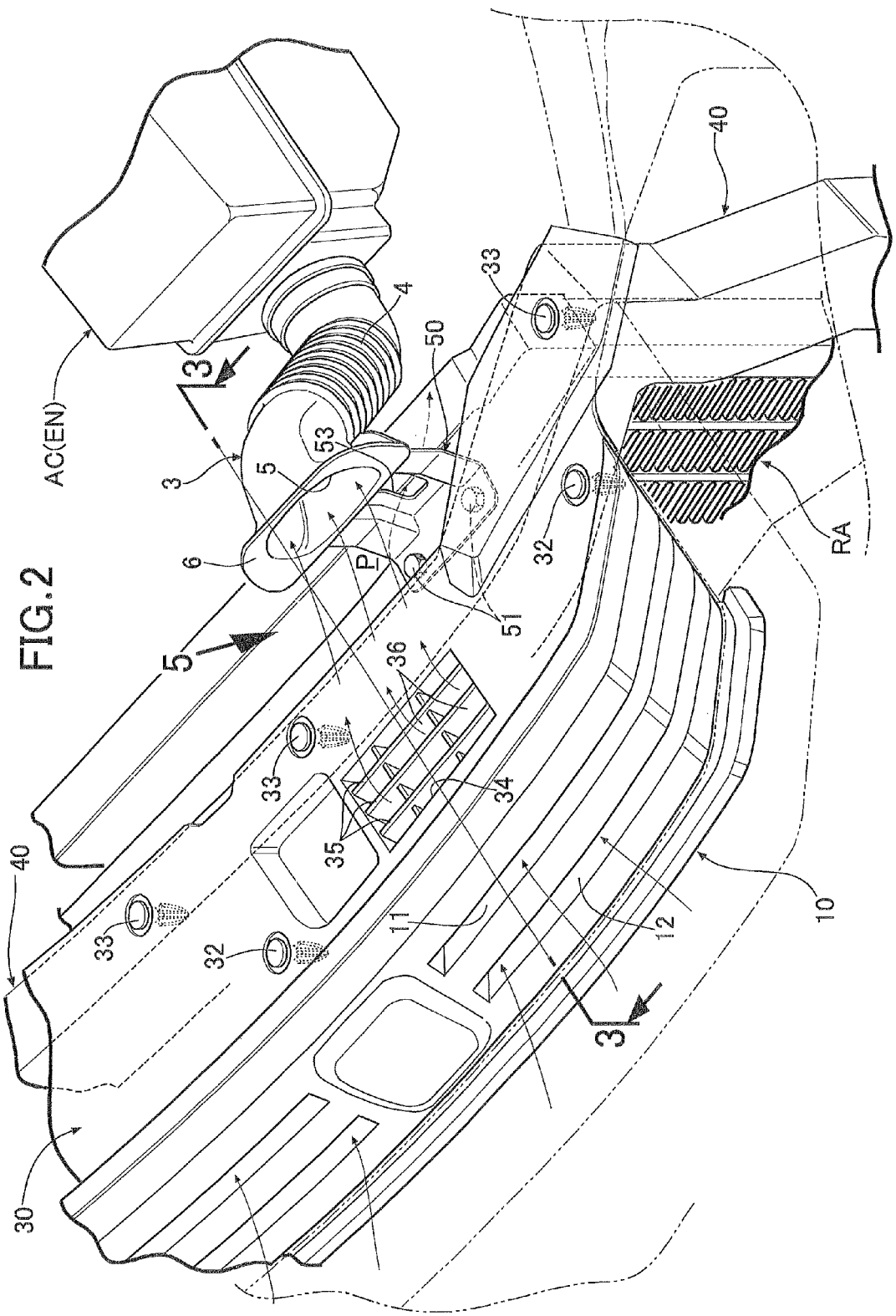
FIG. 2 is an enlarged view of a portion of the invention identified by the arrow 2 in FIG. 1.
Figure 3:
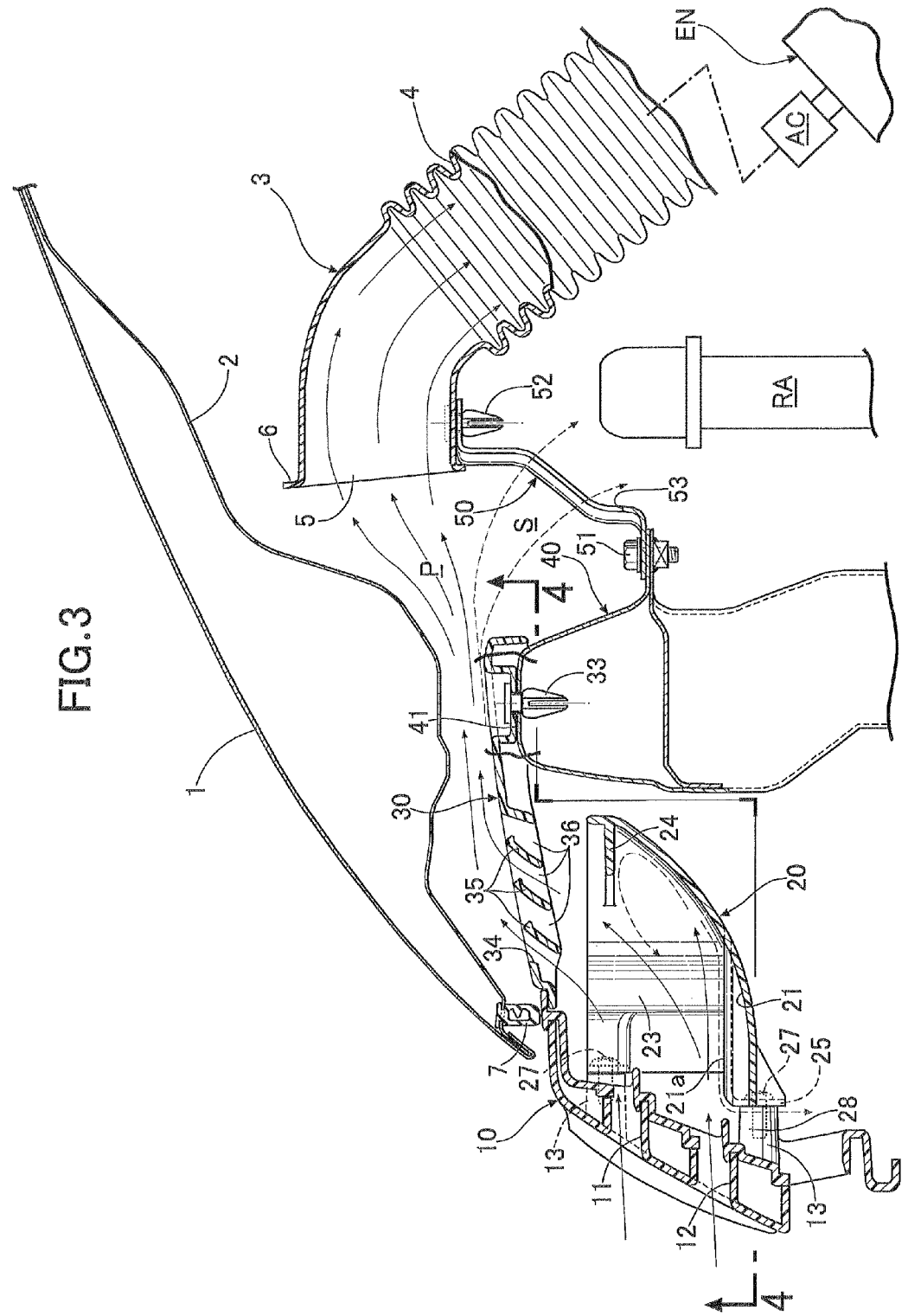
FIG. 3 is a cross-sectional view taken along the line 3-3 in FIG. 2.

In FIGS. 1 to 3, an engine room located in front of a driver seat and covered by a hood panel 1 of an automobile houses an engine body EN and a radiator RA. A bulkhead 40 is provided between the radiator RA and a front grill 10 in a front end of an automobile body.

An intake duct 3 is connected to an inlet of an air cleaner AC connected to an intake system of the engine body EN. The intake duct 3 has a bellows tube 4 in an intermediate portion thereof, is formed into a gooseneck shape and extends forward above the radiator RA. A front portion of the intake duct 3 is supported by a stay 50, which will be described later, that is secured to the bulkhead 40. An intake air introduction port 5 is opened in a front end of the intake duct 3 and toward a wide space in an upper front position of the bulkhead 40, wherein the introduction port 5 facilitates the flow of outside air into the intake duct 3. Also, an outward flange 6 protrudes from a peripheral edge of the intake air introduction port 5, and prevents the flow of exhaust air from the radiator RA into the intake duct 3.

As clearly shown in FIG. 3, the bulkhead 40 crosses the front of the radiator RA with a space therebetween. An upper surface 41 of the bulkhead 40 is located below or lower than the intake air introduction port 5 of the intake duct 3, and an outside air introduction passage P communicating with the intake air introduction port 5 is formed between the upper surface 41 of the bulkhead 40 and a hood frame 2 on a back surface of the hood panel 1.

An intake air guide member 20 is provided in a space defined between the front grill 10 and the bulkhead 40 wherein the guide member 20 is mounted to the grill 10. The intake air guide member 20 is configured to receive the outside air that has passed through vents 11 and 12 in the front grill 10 and into the automobile body. The intake air guide member 20 then smoothly guides a sufficient amount of outside air to the intake duct 3, and positively removes foreign matter, such as moisture or dust, contained in the outside air.

Next, referring to FIGS. 3, 4 and 6, the structure of the intake air guide member 20 will be described. The intake air guide member 20 is integrally molded of a hard synthetic resin material, is open at front and upper sides facing the vents 11 and 12 in the front grill 10, includes a curved guide surface 21 formed to continue from a bottom side to a rear side thereof, left and right side surfaces 22 and 23 formed on left and right sides thereof, and is, as a whole, formed into a scoop shape. The curved guide surface 21 is formed of a curved surface continuously protruding downward, wherein the curved surface is elevated from the bottom side toward the rear side. The right side surface (side surface on a middle side of the automobile body) 23 of the intake air guide member 20 is formed into a curved surface extending forward to extend opening areas of the front and upper sides facing the front grill 10 of the intake air guide member 20 and to increase an amount of outside air flowing into the intake air guide member 20. The left side surface (side surface on an outside of the automobile body) 22 of the intake air guide member 20 has an open front half portion which facilitates the introduction of the outside air into the intake air guide member 20. In an upper portion of an inner surface of the curved guide surface 21, a hood-shaped block wall 24 that extends substantially horizontally in a forward direction is integrally formed along the entire lateral length thereof. The block wall 24 is configured to separate and remove foreign matter, such as moisture or dust, contained in the outside air that flows into the intake air guide member 20.

Figure 4:
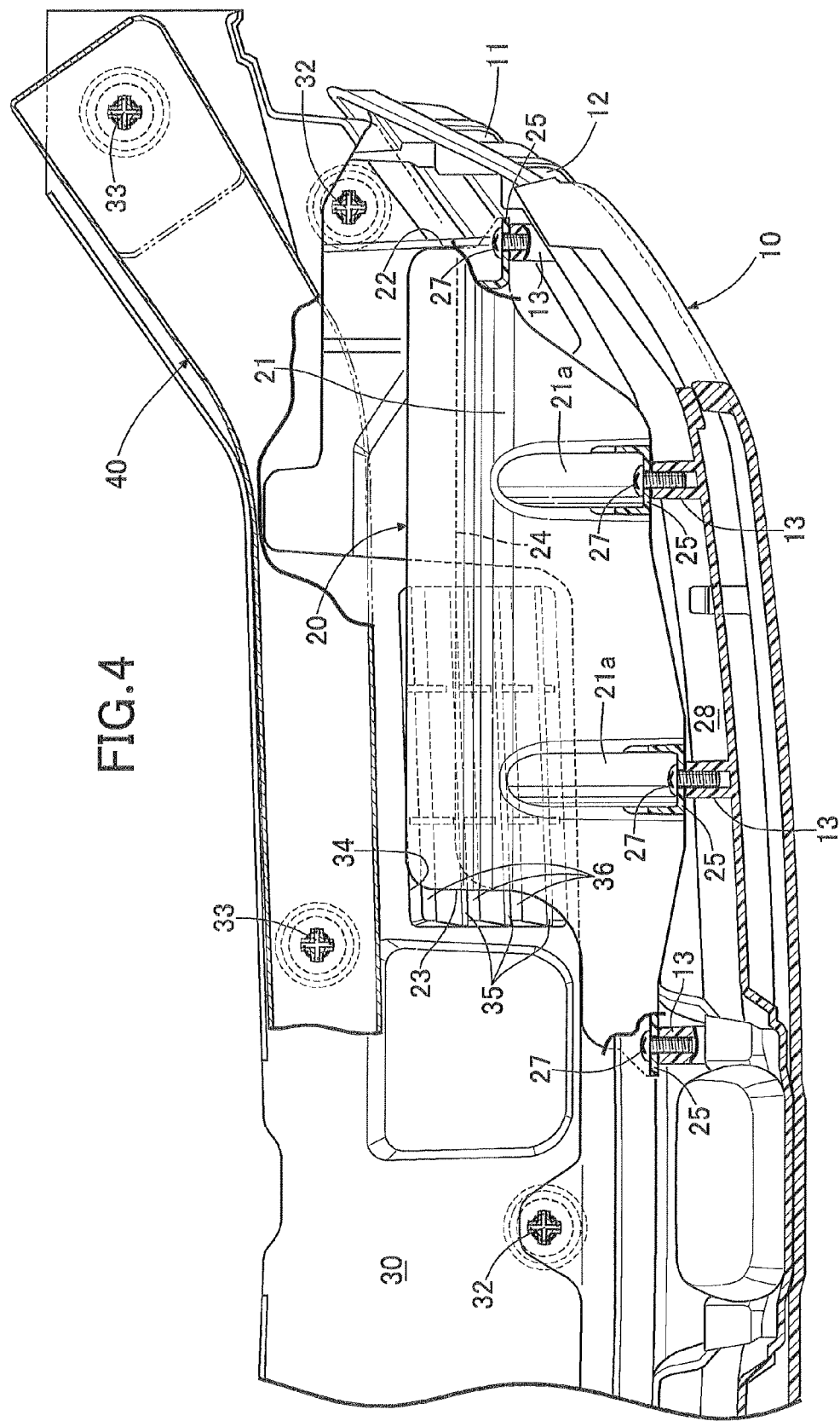
FIG. 4 is a cross-sectional view taken along the line 4-4 in FIG. 3.

As shown in FIGS. 4 and 6, guide ridges 21a and 21a having a section of a protruding shape through which mounting bolts 27 are passed, are formed on the curved guide surface 21 with a space therebetween in a lateral direction. A mounting surface 25 is provided having a mounting hole 26 defined in a front end of each guide ridge 21a and 21a and each side surfaces 22 and 23 of the intake air guide member 20, and each mounting surface 25 is secured to a mounting boss 13 protruding from a back surface of the front grill 10 by the mounting bolt 27. Thus, the intake air guide member 20 is directly mounted to the back surface of the front grill 10.

As shown in FIG. 3, the plurality of vents 11 and 12 arranged in parallel in an up-and-down direction of the front grill 10 face the open front side of the intake air guide member 20, and the front end edge of the curved guide surface 21 of the intake air guide member 20 is located in a position that is lower than or below the lower vent 12 of the front grill 10 and in a plane of projection in the up-and-down direction of the upper vent 11. A gap 28, through which foreign matter removed from the outside air is discharged, is defined between the front end edge of the curved guide surface 21 of the intake air guide member 20 and the front grill 10.

As shown in FIGS. 1 to 3 and 5, a grill cover 30 spans the upper portion of the front grill 10 and the upper surface 41 of the bulkhead 40, and covers a space defined therebetween. The grill cover 30 is formed into a laterally long plate shape along the front grill 10 and the bulkhead 40, a front end portion thereof is secured to the upper portion of the front grill 10 by a plurality of (i.e., three) resin clips 32, and a rear end portion thereof is secured to the upper surface 41 of the bulkhead 40 by a plurality of (i.e., four) resin clips 33. A vent window 34 is defined in a portion of the grill cover 30 corresponding to the intake air guide member 20, the vent window 34 being partitioned by a plurality of guide plates 35 into a plurality of slits 36, wherein the slits 36 guide the outside air flowing through the vent window 34 to the intake air introduction port 5 of the intake duct 4.

As shown in FIGS. 1 to 5, a foreign matter separation space S for separating the foreign matter from the outside air is formed between the bulkhead 40 and the intake duct 3. In the foreign matter separation space S, the stay 50 is provided for supporting a free end of the intake duct 3 on the bulkhead 40. The stay 50 is formed of a rectangular plate member, has a lower portion secured to an upper portion of the bulkhead by a bolt 51, extends upward on the front of the radiator RA, has an upper portion secured to a lower portion of the free end of the intake duct 3 located in a rear upper position of the bulkhead 40 by a resin clip 52, and supports the free end of the intake duct 3 on the bulkhead 40. A discharge port 53 is defined in the stay 50, and any foreign matter remaining in the outside air that is in the foreign matter separation space S is separated from the outside air and discharged to the outside.

As shown in FIG. 3, a tip end of the hood panel 1 closing an upper surface of the engine room is supported on the upper surface of the front grill 10 by a hood seal 7. The hood frame 2 secured to the back surface of the hood panel 1 covers the grill cover 30, the bulkhead 40, the foreign matter separation space S, and the intake duct 3, and defines an upper surface of an outside air introduction passage P formed thereabove.

Next, an operation of the above-discussed embodiment will be described.

Figure 5:
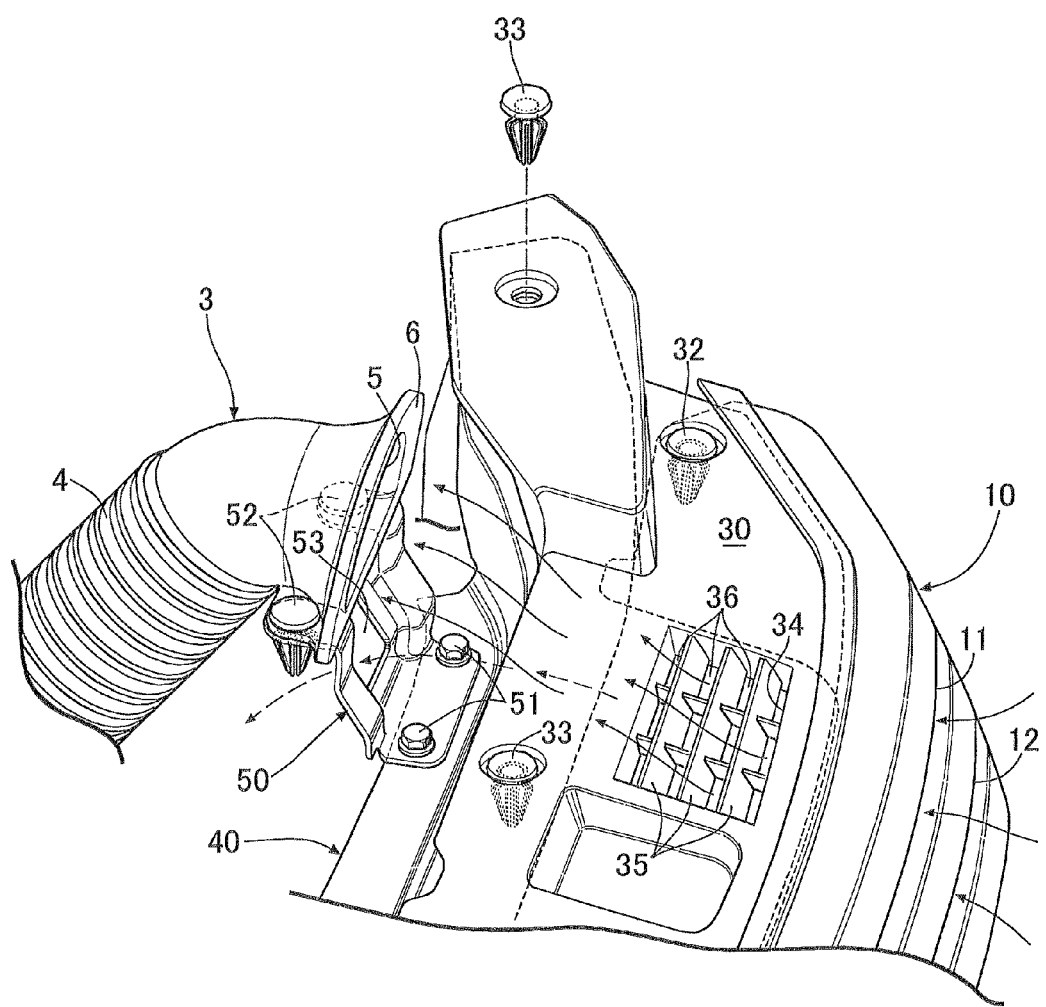
FIG. 5 is a view seen from the arrow 5 in FIG. 2.

Moving air generated by running of the automobile, that is, outside air passing through the plurality of vents 11 and 12 defined in the front grill 10, and passing through the outside air introduction passage P into the intake air introduction port 5, is shown by solid arrows in FIGS. 2, 3 and 5. At this time, the intake air guide member 20 is mounted to the front grill 10, and the front end edge of the curved guide surface 21 of the intake air guide member 20 is located in a position that is lower than the plurality of vents 11 and 12. Thus, a large amount of outside air is guided from the open front and upper sides of the intake air guide member 20 into the intake air guide member 20. The flowing outside air is guided by the curved guide surface 21, flows rearward without being influenced by the running air, passes through the plurality of slits 36 in the grill cover 30, and flows upward thereof.

Now, while the outside air passes from the plurality of vents 11 and 12 through the intake air guide member 20 and through the slits 36 in the grill cover 30, by a labyrinth structure formed thereby, the foreign matter, such as moisture or dust having larger specific gravity than air, included in the outside air is separated from the air, falls in the intake air guide member 20, flows rearward along the curved guide surface 21, is blocked by the block wall 24 and reversed to flow forward, and is discharged through the gap 28 to the outside of the intake air guide member 20, as indicated by dotted arrows in FIG. 3.

Having passed through the slits 36 in the grill cover 30, the outside air flows rearward over the grill cover 30 and into the interior of the foreign matter separation space S, wherein foreign matter having a specific gravity larger than air that remains in the outside air falls into the foreign matter separation space S, and is discharged through the discharge port 53 to the exterior of the outside air introduction passage P. The outside air from which the foreign matter is removed flows through the wide and open mouth of the intake air introduction port 5 located above the radiator RA and into the intake duct 3. The air is then guided to an air cleaner AC of the intake system of the engine body EN.

With the vent window 34 open in the portion corresponding to the intake air guide member 20, even if the grill cover 30 is spanning the upper surfaces of the front grill 10 and the bulkhead 40, the grill cover 30 does not prevent the outside air from being introduced into the intake air introduction port 5. Also, the grill cover 30 covers the space between the front grill 10 and the bulkhead 40 so that the front grill 10 and the bulkhead 40 are not exposed to the outside and can provide an aesthetically appealing appearance, and further can prevent tools, such as for maintenance of devices around the engine, from falling into the intake air guide member 20.

Furthermore, the outward flange 6 protruding around an opening of the intake air introduction port 5 prevents exhaust air passing through the radiator RA from flowing into the intake air introduction port 5.

An embodiment of the present invention is explained above, but the present invention is not limited to the above-mentioned embodiment and may be modified in a variety of ways as long as the modifications do not depart from its gist.

What is claimed is:

1. An intake air introducing structure for an automobile in which outside air introduced from a front grill is guided to an intake air introduction port of an engine body disposed above a radiator, the structure comprising:

an intake air guide member provided between the front grill and the radiator, wherein the intake air guide member is mounted to the front grill, wherein the intake air guide member is open at a front side and an upper side so as to receive the outside air from the front grill, and has a curved guide surface that is inclined in an upward direction from a bottom side toward a rear side and has a curved shape which protrudes downward, and a block wall provided at an upper portion of the curved guide surface and protruding forward toward the front side from the upper portion of the curved guide surface and extending over the curved guide surface.

2. The intake air introducing structure according to claim 1, wherein a gap is defined between a front end edge of the intake air guide member and the front grill, wherein the front end edge of the intake air guide member is positioned to be lower than a vent defined in the front grill.

3. The intake air introducing structure according to claim 1, wherein a bulkhead is provided between the front grill and the radiator, the intake air guide member being located between the front grill and the bulkhead, a rear portion of the curved guide surface extends above the bulkhead, and the outside air guided by the intake air guide member passes above the bulkhead and into the intake air introduction port.

4. The intake air introducing structure according to claim 3, wherein a grill cover is provided above the intake air guide member and spans the front grill and the bulkhead, a vent window is defined in a portion of the grill cover opposing the intake air guide member, and wherein the outside air guided by the curved guide surface passes through the vent window and is guided to the intake air introduction port.

5. The intake air introducing structure according to claim 3, wherein the intake air introduction port is located above the bulkhead and is secured to a stay mounted to the bulkhead.

6. The intake air introducing structure according to claim 5, wherein a discharge port is defined in the stay.

7. An intake air introducing structure for an automobile in which outside air introduced from a front grill is guided to an intake air introduction port of an engine body disposed above a radiator, the structure comprising:

an intake air guide member provided between the front grill and the radiator, wherein the intake air guide member is mounted to the front grill, wherein the intake air guide member is open at a front side and an upper side so as to receive the outside air from the front grill, and has a curved guide surface that is inclined in an upward direction from a bottom side toward a rear side and has a curved shape which protrudes downward, and a block wall provided on an upper portion of the curved guide surface and protruding toward the front side from the curved guide surface, wherein a bulkhead is provided between the front grill and the radiator, the intake air guide member being located between the front grill and the bulkhead, a rear portion of the curved guide surface extends above the bulkhead, and the outside air guided by the intake air guide member passes above the bulkhead and into the intake air introduction port, wherein the intake air introduction port is located above the bulkhead and is secured to a stay mounted to the bulkhead, and wherein a discharge port is defined in the stay.

8. The intake air introducing structure according to claim 7, wherein a gap is defined between a front end edge of the intake air guide member and the front grill, wherein the front end edge of the intake air guide member is positioned to be lower than a vent defined in the front grill.

9. The intake air introducing structure according to claim 7, wherein a grill cover is provided above the intake air guide member and spans the front grill and the bulkhead, a vent window is defined in a portion of the grill cover opposing the intake air guide member, and wherein the outside air guided by the curved guide surface passes through the vent window and is guided to the intake air introduction port.

* * * * *